United States Patent [19]
Suzuki et al.

[11] 4,158,497
[45] Jun. 19, 1979

[54] COPYING APPARATUS

[75] Inventors: Shigeru Suzuki, Yokohama; Tatsuo Tani, Tokyo, both of Japan

[73] Assignee: Ricoh Co., Ltd., Japan

[21] Appl. No.: 828,221

[22] Filed: Aug. 26, 1977

[30] Foreign Application Priority Data

Aug. 31, 1976 [JP] Japan .................. 51-104121
Nov. 12, 1976 [JP] Japan .................. 51-135896

[51] Int. Cl.² .............. G03B 15/00; G03B 27/34; G03B 27/40; G03B 27/70
[52] U.S. Cl. .................................. 355/8; 355/11; 355/51; 355/57; 355/66
[58] Field of Search ............... 355/8, 51, 57, 65, 66, 355/11

[56] References Cited
U.S. PATENT DOCUMENTS

| 3,957,368 | 5/1976 | Goshima et al. | 355/51 X |
| 4,077,714 | 3/1978 | Komori et al. | 355/66 X |

Primary Examiner—Richard A. Wintercorn
Attorney, Agent, or Firm—McGlew and Tuttle

[57] ABSTRACT

The apparatus has separate original placing stations for producing copies of an original which is bulky, as in the form of a book, and of an original which is in sheet form. In one of these two original placing stations the original remains stationary and is illuminated by a slit illuminating device which is reciprocated, while, in the other original placing station the original is moved and a slit illuminating device remains stationary to effect illumination of the original. Separate slit illuminating devices can be used for the two separate original placing stations, or a common slit illuminating device can be used for the two original placing stations. Even when separate illuminating devices are used, part of the optical system and a photosensitive member are used in common with the two stations. In the original placing station wherein the original remains stationary, copies of sizes different from the size of the original can be produced by varying the rate of movement of the slit illuminating device and the optical path length of the optical system. In the original placing station wherein the original is moved, copies of sizes different from the size of the original can be produced by varying the original feed speed and the optical path length of the optical system.

11 Claims, 7 Drawing Figures

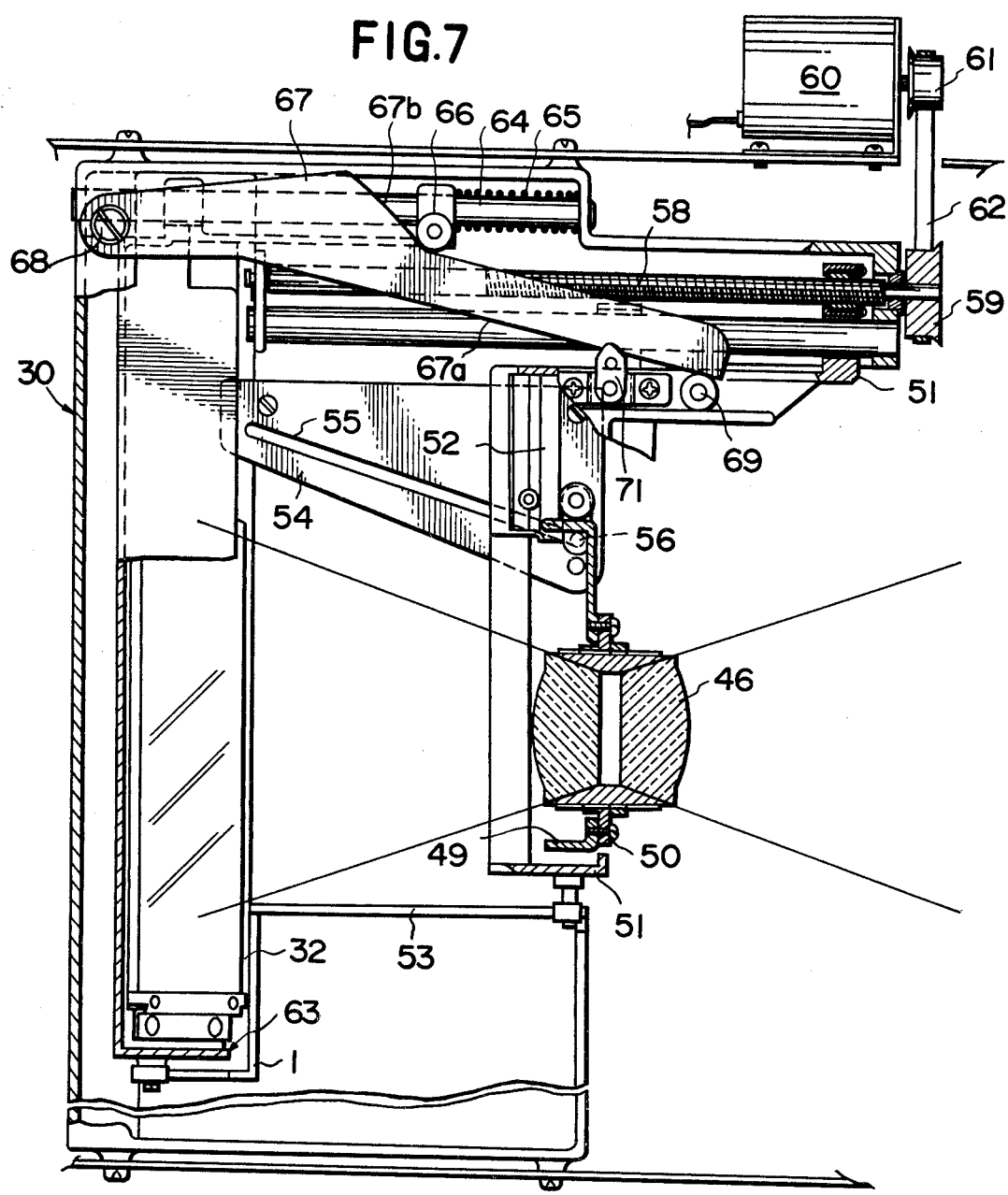

COPYING APPARATUS

BACKGROUND OF THE INVENTION

This invention relates to copying apparatus, and more particularly to a copying apparatus of the type which makes it possible to select a position for placing an original depending on the type of the original and which enables copies different in size from the original to be produced if the original is of the type suitable for doing so.

Originals for document copying can be broadly divided into two groups. One group consists of originals which are bulky, such as books (hereinafter referred to as book originals), and the other group consists of single documents or drawings (hereinafter referred to as sheet originals). When copies of a book original are to be produced, the present practice is to provide a glass plate of a size large enough to place the original thereon and to move a light source along the surface of the original to illuminate the same and to produce an optical image thereof. In copying apparatus wherein copying of a book original can be effected, it is possible to effect copying of a sheet original so long as the sheet original is of a size which is large enough to be placed on the glass plate. Thus the copying apparatus generally available nowadays are of the type which are adapted for producing copies of book originals.

When copies of a sheet original are to be produced by using the copying apparatus of the aforesaid type, it is common practice to position the sheet original in a predetermined position on the glass plate depending on the size of the original and to press the surface of the sheet original against the surface of the glass plate by means of a pressing plate. Since the sheet original is light in weight, there is the possibility of the sheet original deviating from the proper position when an external force is exerted thereon, no matter how small such external force may be. Thus, even if the sheet original is placed in a proper position on the glass plate, it may be made to deviate from the proper position by misoperation of the pressing plate. Such being the case, it is a nerve-racking, troublesome operation to hold the sheet original in position by means of the pressing plate without causing deviation of the sheet original from the proper position.

When only the sheet originals are handled, it is more advantageous to use a copying apparatus of the type in which the light source is fixed and a sheet original is illuminated by a slit illumination source by feeding the sheet original to an illuminating position. When this type of copying apparatus is used, there are no limits placed on the length of an original and the original may have any length as desired, although the width of the original is limited by the length of the slit illuminating position. Thus it is not desirable to use copying apparatus adapted for book originals for producing copies of sheet originals.

SUMMARY OF THE INVENTION

This invention has as its object the provision of a copying apparatus which obviates the aforesaid disadvantages which copying apparatus of the prior art have when used for producing copies of sheet originals.

Copying apparatus commercially available nowadays are generally designed to produce copies of the same size as the original. However, there has in recent years been a demand for a copying apparatus which enables sheet originals, such as drawings, newspapers and other graphic material, to be duplicated on a reduced scale. In many cases, the rates of reduction desired are such that the linear magnification of an orignal is made $1/\sqrt{2}=0.707$ so as to reduce the area ratio to $\frac{1}{2}$, the area ratio is reduced to 1/1.5 or the linear magnification is reduced to $1/\sqrt{1.5}=0.816$ so as to change the size of a sheet from B type to A type of the Japanese standards, and the area ratio is reduced to 1.5/2 or the linear magnification is reduced to $\sqrt{1.5/2}=0.866$ so as to change the size of a sheet from A type to B type which is smaller than A type.

A mechanism for varying the sizes of copies produced from the size of an original for a copying apparatus is relatively simple in construction when the copying apparatus has an optical system of total illumination. However, when the copying apparatus uses slit illumination wherein the light source is moved, the mechanism for varying the sizes of copies produced from the size of an original has hitherto been very complex in construction. Thus very few types of conventional copying apparatus which are intended for producing copies of book originals are capable of producing copies differing in size from originals. In copying apparatus specially constructed for producing copies differing in size from originals, a copying process takes place at a constant speed and it is necessary to vary the speed at which scanning is effected by the light source when the sizes of copies produced are varied from the sizes of originals. Generally, when the magnification is smaller than unity or the sizes of copies produced are smaller than the sizes of originals, the scanning speed must be increased. This increases costs and the apparatus thus constructed does not lend itself to meeting the demand of the users in general.

Therefore, another object of the invention is to provide a copying apparatus of low cost which enables copies of book originals to be produced by a conventional method and which at the same time makes it possible to produce copies differing in size from sheet originals.

The aforementioned objects of the invention are accomplished by a copying apparatus in which a book original and a sheet original are placed in separate positions, and an optical image of the original can be formed selectively either by means of the scanning by slit illumination or fixed slit illumination depending on the type of the original.

BRIEF DESCRIPTION OF THE DRAWINGS

FIG. 7 is a fragmentary plan view of the optical system moving device shown in FIG. 6.

DESCRIPTION OF THE PREFERRED EMBODIMENTS

Figure 1:
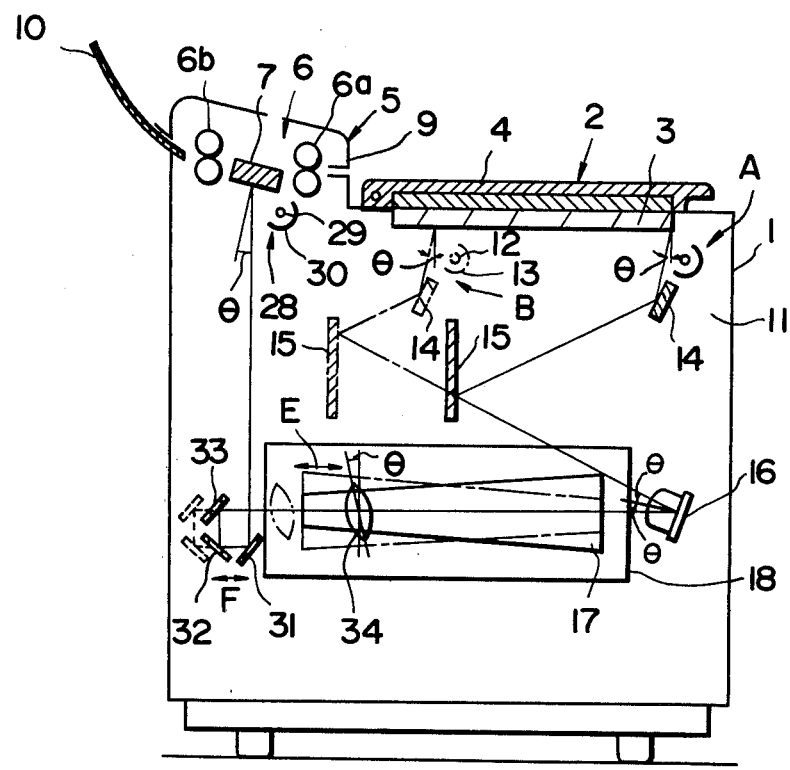
FIG. 1 is a vertical transverse sectional and partly schematic view of the copying apparatus comprising one embodiment of the invention.
Figure 2:
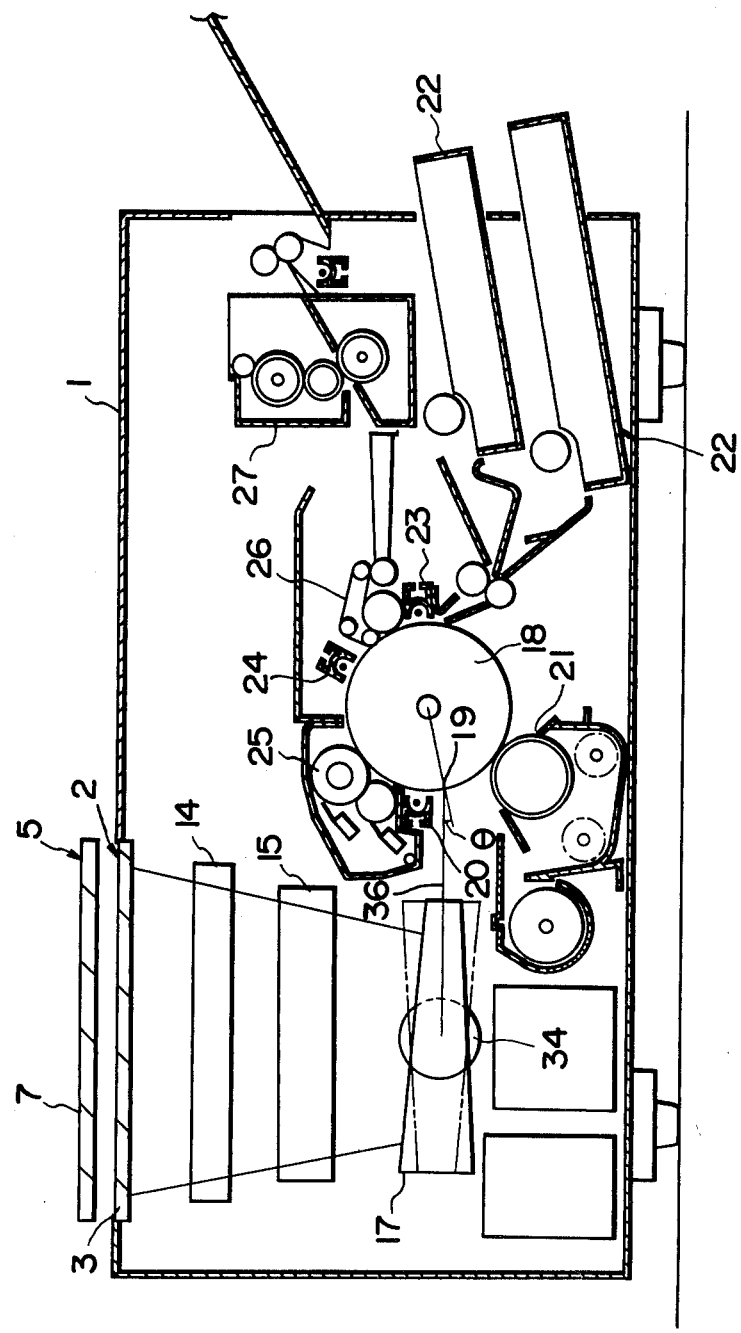
FIG. 2 is a vertical longitudinal sectional and partly schematic view of the apparatus shown in FIG. 1.

Referring to FIGS. 1 and 2, a first original placing station generally designated by the reference numeral 2 comprises a contact glass plate 3 mounted on a frame 1 of the copying apparatus, and a pressing plate 4 for pressing an original against the contact glass plate 3 to keep the same stationary which pressing plate 4 is pivotally supported by the frame 1.

A second original placing station 5 is located rearwardly of the first original placing station 2 (on the right side of the station in FIG. 1) as seen from the operator's position, and comprises an original feed and delivery device 6 including, for example, a pair of original feed rollers 6a, a pair of original delivery rollers 6b, and an illuminating glass plate 7. The second original placing station 5 is provided with a cover. An original is fed through an inlet 9 into the second original placing station 5, and discharged onto an original receiving tray 10. The original feed and delivery device 6 may be in the form of a belt device.

The first original placing station 2 is mainly used for placing a book original thereon. It is to be understood that a sheet original may, of course, be placed in the first original placing station 2. The book original placed on the contact glass plate 3 is illuminated by the scanning thereof by a first slit illuminating device 11 which is reciprocable between a stand-by position A and a scanning terminating position B. The first slit illuminating device 11 comprises a light source 12, a reflector 13, and a first mirror 14 for reflecting light rays from the original. The first slit illuminating device 11 is mounted on the machine frame and is reciprocable as a unit. The first slit illuminating device 11 moves in the direction of an arrow in FIG. 1 to illuminate the original in slit form, and moves in a direction opposite to the direction of the arrow after completion of illumination to return to its original position.

The light rays reflected by the first mirror 14 are reflected by a second mirror 15 to be incident on an in-mirror lens 16. Light rays emerging from the in-mirror lens 16 are reflected by a movable mirror 17 and projected onto an exposing position 19 of a photosensitive member 18.

The photosensitive member or drum 18, and for example, has its outer periphery charged by a charger 20, has the exposing station 19 exposed to an optical image of the original to form an electrostatic latent image formed therein, and has the latent image developed by a developing device 21 in the usual manner. The developed image is transferred, under the action of a charger 23, to a copy sheet fed from a sheet feed device 22, the copy sheet to which the developed image has been transferred is forwarded by a delivery means 26 to a fixing device 27. After the image is fixed on the sheet, the sheet is delivered from the apparatus. After passing through the transfer printing section, the drum 18 is discharged by a discharger 24 and cleaned by a cleaning device 25 to be ready for repeating the aforementioned cycle again. It is to be understood that the photosensitive member 18 may be in the form of a sheet and need not necessarily be in drum form as shown.

The electrostatic latent images of the book original are continuously formed on the outer periphery of the photosensitive drum 18 as the original is scanned by the first slit illuminating device 11 on the contact glass plate 3. Such images are transferred to copy sheets after being developed. The original is illuminated while being fixed in its position.

The second mirror 15 moves in synchronism with the movement of the first slit illuminating device 11 as the first slit illuminating device moves in scanning movement. The second mirror 15 moves at a proper speed or usually at one half the speed of movement of the first slit illuminating device 11 so that the optical path length from the original illuminating position to the in-mirror lens 16 may not change.

The second original placing station 5 is used for producing copies of a sheet original. Upon being inserted in the inlet 9, the original is fed over the illuminating glass plate 7 by the feed rollers 6a, and nipped by the delivery rollers 6b to be delivered to the original receiving tray 10. When the original moves over the illuminating glass plate 7, it is subjected to the illumination of light rays from a second slit iluminating device 28.

The second illuminating device 28, which comprises a light source 29 and a reflector 30, is fixed or remains stationary. The light rays reflected by the original are reflected by a third mirror 31 which remains stationary. The light rays reflected by the third mirror 31 are again reflected by a fourth mirror 32 and a fifth mirror 33 mounted on one frame, and are incident on a through lens 34. The light rays emerging from the through lens 34 are reflected by a movable mirror 17 and projected onto the outer periphery of the photosensitive drum 18 as is the case with the illumination of an original placed in the first original placing station 2, so as to form an electrostatic latent image of the original thereon.

Switching between the two illumination systems when the first original placing station or the second original placing station is used may be effected as by a change-over switch. When switching is effected, the supply of electricity is switched from the first slit illuminating device 11 to the second slit illuminating device 28 or vice versa, and the change-over of the optical system for the first slit illuminating device 11 to the optical system for the second slit illuminating device 28 or vice versa is effected by changing the position of the movable mirror 17.

Figure 3:
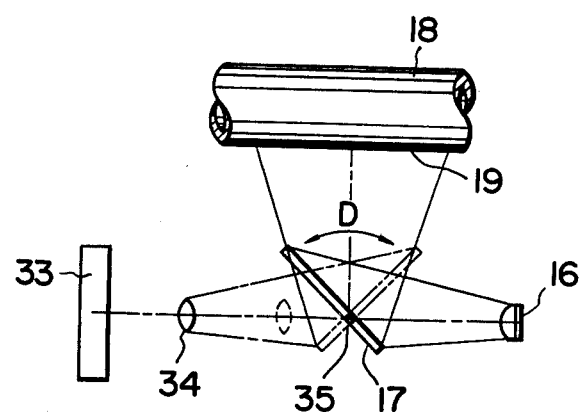
FIG. 3 is a diagrammatic view in explanation of the optical system.

FIG. 3 illustrate one example of the relationship between the optical system for the first original placing station 2 and the optical system for the second original placing station 5. The in-mirror lens 16 and the through lens 34 are arranged such that the principal light ray, of light rays emerging from one lens, is disposed in the same plane as the principal light ray, of light rays emerging from the other lens. The movable mirror 17 can be pivoted between a first inclined reflecting position shown in solid lines, in which it reflects the light rays from the in-mirror lens 16 to the exposing position 19 on the photosensitive drum 18, and a second inclined reflecting position shown in dash-and-dot lines, in which it reflects the light rays from the through lens 34 to the exposing position 19. The movable mirror 17, which is pivotally supported by a shaft 35, is advantageously in the form of a double-face mirror so that the mirror may move through a small angle about the shaft 35 in the direction of an arrow D, to prevent the mirror 17 from striking the through lens 34 when moving to its first inclined position.

If the fourth mirror 32 and fifth mirror 33 for reflecting the light rays from the second original placing station 5 are made movable, as shown by an arrow F in FIG. 1, and the through lens 34 is made movable in the direction of an arrow E in synchronism with the movement of the fourth mirror 32 and fifth mirror 33, it is possible to form, on the photosensitive drum 18, an electrostatic latent image which differs in size from the original placed in the second original placing station 5. The amount of movement of the fourth mirror 32 and fifth mirror 33 and the amount of movement of the through lens 34 are adjusted beforehand in such a manner that the optical path length is commensurate with the selected rate of magnification of the original. In place of moving the fourth mirror 32 and fifth mirror 33 transversely as shown, the third mirror 31 and fourth mirror 32 may be made movable together vertically in FIG. 1.

The exposing position 19 on the outer periphery of the photosensitive drum 18 is advantageously disposed slightly below the horizontal line passing through the center axis of the drum 18 as shown in FIG. 2 so as to occupy no more space than is necessary, considering the arrangement of various devices around the drum 18. If this is the case, a principal light ray 36 of the light rays incident on the exposing position forms an angle $\theta$ with that radius of the drum 18 which passes through the exposing position 19. That is, the optical axis slants with respect to the surface of the image. To correctly form an image of an original requires correction of this angle of inclination. The inclination $\theta$ of the principal light ray 36 is made to agree with the angle formed by the principal light ray 36 and the optical axis of the in-mirror lens 16 when the light rays are transmitted through the in-mirror lens 16. The light rays reflected by the original placed in the first original placing station 2, whose principal light ray is inclined through an angle $\theta$ with respect to the normal to the contact glass plate 3, are selected as image forming light rays. When the second slit illuminating device 28 is used, the through lens 34 is arranged such that the optical axis thereof is inclined through an angle $\theta$ with respect to the principal light ray, and the illuminating glass plate 7 of the second original placing station 5 is inclined in such a manner that the normal to the surface of the glass plate 7 and the principal light ray form an angle $\theta$. Thus if the principal light ray is vertical, then the glass plate surface is inclined through an angle $\theta$ with respect to the horizontal. By arranging the in-mirror lens 16 and the through lens 34 as aforementioned, it is possible to enable an image of an original to be formed in the same portion of the photosensitive drum either through the through lens 34 or in-mirror lens 16 with no error in the angle of incidence.

The provision of two sets of optical systems offers the following advantages:

(1) As compared with a copying apparatus having one optical system, the apparatus having two sets of optical systems has a sheet original inlet which can be freely selected with respect to the relative height of the original placing glass plate and the original pressing plate, so that the apparatus is more convenient to use because an original can be inserted in the sheet original inlet from above the pressing plate, as described in the embodiment shown and above.

(2) The apparatus having two sets of optical systems has greater latitude with regard to the direction in which an original is fed and to the edge of the original which forms a leading edge than apparatus having one optical system, so that it is possible to construct the apparatus in a manner to enable an original to be inserted from the front as compared with conventional apparatus wherein an original is inserted transversely into the apparatus, thereby increasing operational efficiency.

The in-mirror lens used with the optical system offers advantages in that the optical space can be reduced, and focusing adjustments can be readily effected when copies produced are of the same size as the original. However, it has a disadvantage in that it does not lend itself to use for producing copies differing in size from the original because the optical path shows a deviation when the lens is moved. On the other hand, the through lens has advantages in that optical path design for a variable magnification optical system is easy, and the lens and mirrors of the variable magnification optical system can be moved by a simple construction. However, it has the disadvantage of requiring complicated manipulation in effecting focusing adjustments and adjustments of the lens when copies of the same size as the original are produced.

Thus, in the present invention, two optical systems are incorporated and the in-mirror lens and the through lens are used each in its own proper way so as to make the most of their advantages.

When the outer exposing position 19 of the photosensitive drum 18 is exposed to optical images of an original, the drum 18 rotates at a constant rotational speed. Thus, the rate of movement of the first slit illuminating device 11 for illuminating an original placed in the first original placing station 2 and the peripheral velocity of the original feed and delivery device 6, such as the original feed rollers 6a and original delivery rollers 6b, of the second original placing station 5 are set at the same value as the peripheral velocity of the drum 18. It is to be understood that the rotational speed of the original feed rollers 6a and original delivery rollers 6b can be varied in accordance with a magnification rate (m). If the speed of the original is v when the copying magnification is 1.0, then the speed of the original is v/m when a copying magnification is m. For example, when copies produced are reduced in size at a linear magnification ½ as compared with the original, the peripheral velocity of the rollers is changed such that it is twice as high as when the copies produced are of the same size as the original. Any known mechanism may be used for changing the peripheral velocity of the original feed rollers and original delivery rollers.

Figure 4:
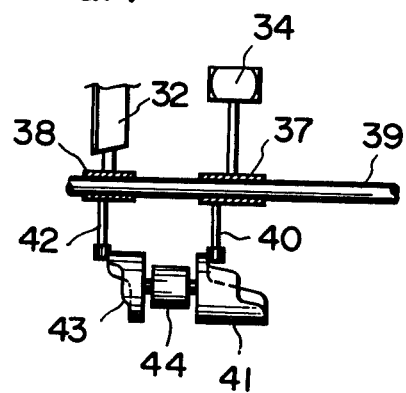
FIG. 4 is a diagrammatic view in explanation of the drive mechanism for moving the lens and mirrors when copies produced differ in size from an original.

FIG. 4 illustrates an example of the driving device for moving the fourth mirror 32 and fifth mirror 33 and the through lens 34 when sizes of the copies produced are varied from the size of the original. A support base 37 for supporting the through lens 34 and a frame 38 for supporting the fourth mirror 32 and fifth mirror 33 are slidably supported on a shaft 39. The support base 37 has attached thereto a first cam follower 40 which is driven by a first cam 41, and the frame 38 has attached thereto a second cam follower 42 which is driven by a second cam 43.

The first cam 41 and second cam 43 are connected through a rotary clutch 44 and driven by such clutch. The angle of rotation of the rotary clutch 44 during one operation is set in accordance with the size of the copies produced by magnifying the original. For example, if copies identical in size to the original and three types of copies differing in size from the original are to be produced, the rotary clutch used is a ¼ rotation clutch. In place of the rotary clutch, any actuator may be used which produces rotation through a predetermined angle. The cam profiles of the cams 41 and 43 in FIG. 4 are selected such that the fourth mirror 32, fifth mirror 33 and through lens 34 can be moved to predetermined positions in accordance with the selected rate of magnification.

When copying is performed by placing an original in the first original placing station 2, if the movable mirror 17 is moved to the first inclined reflecting position and a copying button is depressed, the first slit illuminating device 11 and the second mirror 15 will move in reciprocatory movement, and the exposing position 19 on the rotating photosensitive drum 18 will be successively exposed to optical images of the original so as to form electrostatic latent images thereon.

When the second original placing station 5 is used for performing copying, the movable mirror 17 is moved to the second inclined reflecting position and the pair of original feed rollers 6a and the pair of original delivery rollers 6b are driven.

Upon insertion of an original in the original inlet 9, the moving original is illuminated portion by portion by the second slit illuminating device 28 and the rotating drum 18 is successively exposed to an optical image of the original so as to finally form an electrostatic latent image thereon.

When it is desired to produce copies on a reduced scale, the apparatus is switched to a desired rate of magnification. More specifically, a changeover switch is actuated to rotate the rotary clutch 44 shown in FIG. 4 through a predetermined angle, so as to thereby move the third and fourth mirrors 32 and 33 and the through lens 34 to predetermined positions and to vary the peripheral velocity of the original feed rollers 6a. If an original is inserted in the original inlet 9, an electrostatic latent image of a size which is varied at the desired rate of magnification is formed on the drum 18. Generally, copies of an original are produced on a reduced scale, but copies on an enlarged scale can be produced based on the same technical concept.

If the copying apparatus according to the invention is used, a book original and a sheet original can be copied in the most appropriate position. Moreover, since no limitations are placed on the length of a sheet original, it is possible to produce copies of any size imaginable so long as the exposing width of the copying apparatus is set at the maximum value of the standardized widths.

Furthermore, if the reflector 13 of the first slit illuminating device 11 and the reflector 30 of the second slit illuminating device 28 are arranged such that they reflect light rays in a direction opposite to the direction in which the operator stands, the disadvantage of the operator having his or her eyes injured by the light reflected by the illuminating devices can be obviated.

In place of the in-mirror lens 16, an image forming optical system comprising a mirror and a through lens may be used. Also, in place of using the movable mirror 17, a mirror for reflecting light rays from the in-mirror lens 16 to the photosensitive drum 18 and another mirror for reflecting light rays from the through lens 34 to the photosensitive drum may be provided separately.

Figure 5:
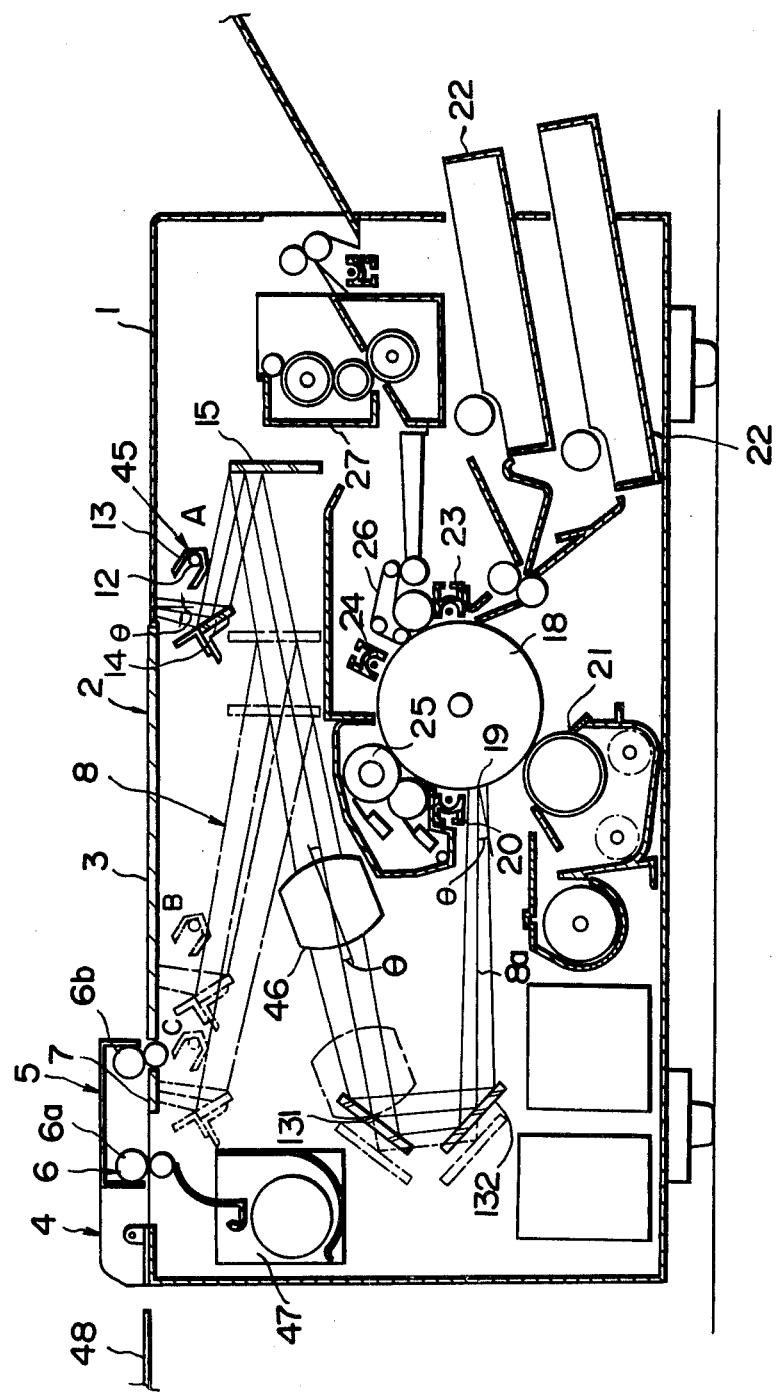
FIG. 5 is a vertical longitudinal sectional and partly schematic view of the copying apparatus comprising another embodiment of the invention.

In the embodiment described with reference to FIGS. 1 and 2, the second slit illuminating device 28 shown in FIG. 1 may be eliminated and the first slit illuminating device 11 may be made movable to the illuminating position of the second original placing station 5, with the slit illuminating device 11 being fixed in the illuminating position of the second original placing station 5 when copying of an original placed in the second original placing station 5 is performed. If this is the case, the need to switch between the two optical systems is eliminated. In this case, it is necessary to move the mirrors and lens if production of copies differing in size from original placed in the second original placing station 5 is to be made possible. FIG. 5 shows one example of the optical system which can be used in common with the first original placing station 2 in which no magnification of an original is required and the second original placing station 5 in which copies differing in size from the original can be produced. Parts other than those of the optical system are based on the same concept as those of the embodiment shown in FIG. 1, so that similar or equivalent parts are designated by like reference characters and their description is omitted.

Referring to FIG. 5, there is provided only one slit illuminating device 45 comprising a light source 12, a reflector 13 and a first mirror 14 which are similar to the corresponding parts of the first slit illuminating device 11 shown in FIG. 1. In performing copying of an original placed in the first original placing station 2, the slit illuminating device 45 reciprocates between a stand-by position A and an illumination terminating position B. At this time, the second mirror 15 moves in synchronism with the slit illuminating device 45 at a speed which is about one half the speed of the device 45.

In copying an original placed on the second original placing station 5, the slit illuminating device 45 moves beyond the position B, which is the limit of the illumination range for the first original placing station 2, into a position C in which the device 45 is fixed in place. The second mirror 15 also moves in an amount commensurate with the amount of movement of the device 45, so that the optical path length between the original illuminating position and a lens 46 can be maintained at the same magnitude as the optical path length between the original illuminating position of the first original placing station 2 and the lens 46.

The light rays transmitted through the lens 46 are reflected by the third mirror 131 and fourth mirror 132 and form an electrostatic latent image on the outer periphery of the photosensitive drum 18.

When it is desired to change the rate of magnification of copying of the original placed in the second original placing station 5, the lens 46 and the third and fourth mirrors 131 and 132 are moved along the principal light ray of the optical path, so that the optical path length can be varied and the position of the lens can be varied. At this time, the original feed and delivery device 6, such as the pair of original feed rollers 6a, has its speed varied in accordance with a change in the rate of magnification of the original to be copied.

It is to be understood that, when necessary, the speed of the drum 18 may be varied instead of varying the speed of the pair of original feed rollers 6a.

If it is possible to vary the rotational speed of the drum 18, it is possible to vary the rate of magnification of an original to be copied by placing the original in the first original placing station 2. Also, even if the peripheral velocity of the drum remains the same, it is possible to vary the rate of magnification of the original placed in the first original placing station 2 by varying the scanning speed of the slit illuminating device.

In the second original placing station 5, the illumination glass plate 7 may be overheated because it is continuously illuminated by the illuminating device. A blower 47 may be advantageously provided to avoid the trouble which may result from overheating.

In FIG. 5, an original is placed on an original support plate 48 and supplied to the original feed and delivery device 6 by which the original is transferred to the illuminating glass plate 7. When the pair of original delivery rollers 6b are used as part of the original feed and delivery device 6, the upper roller of the pair of delivery rollers 6b is preferably displaced toward the original feed side as shown so that, when the original is released from the delivery rollers 6b, the leading end of the original may be directed slightly upwardly, with the result that the accident of the original impinging on the edge of the contact glass plate 3 of the first original placing station 2 and of the delivery thereof being interfered with can be prevented. When a large number of originals are successively copied, it is possible to pile the originals in a stack on the contact glass plate 3 without causing any trouble.

Figure 6:
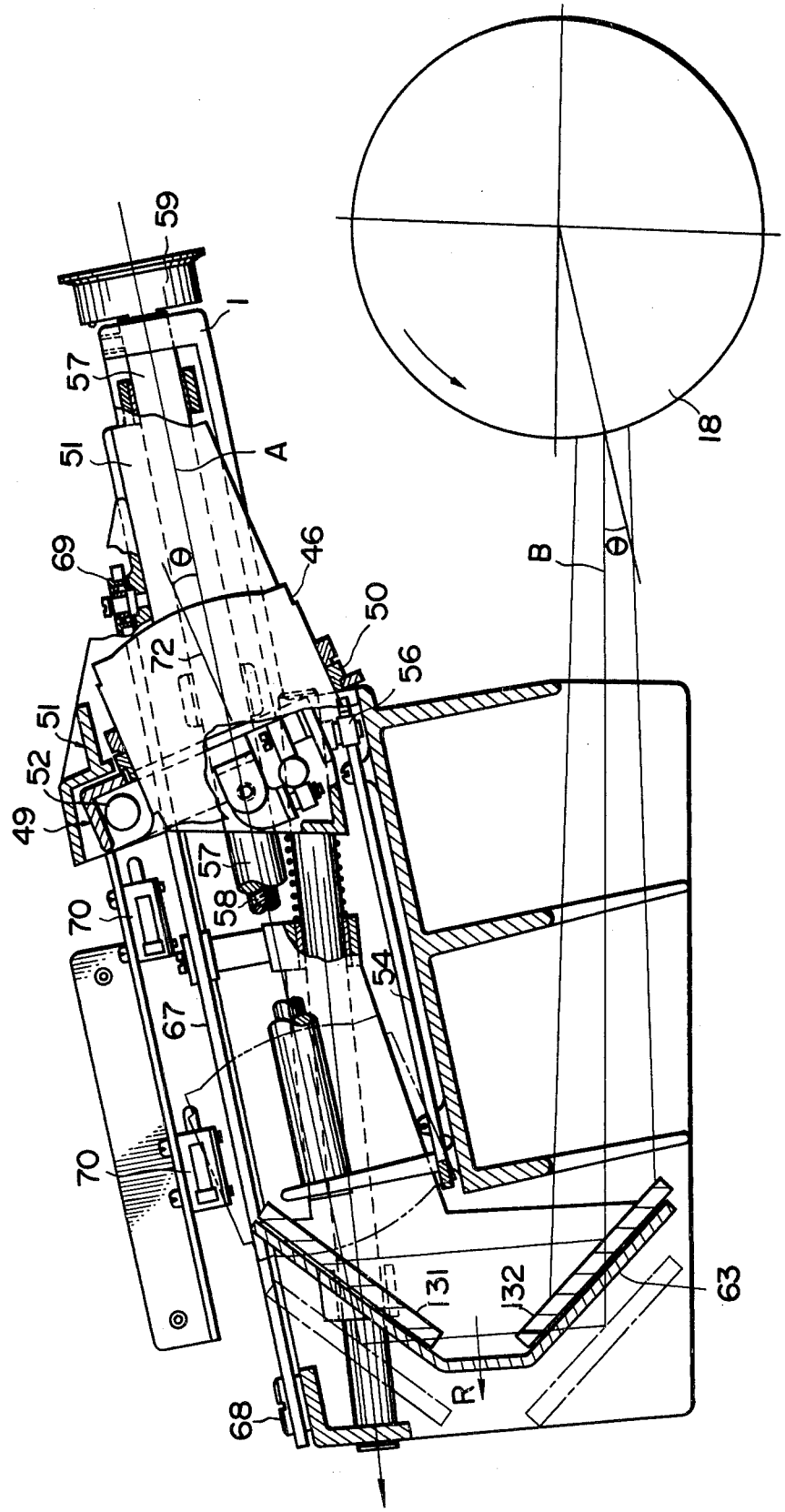
FIG. 6 is a vertical longitudinal sectional view of the optical system moving device for moving the lens and mirrors when copies produced differ in size from an original.

FIGS. 6 and 7 show one example of the optical system moving device for moving the lens 46 and third and fourth mirrors 131 and 132 in order to vary the rate of magnification of an original.

Referring to FIGS. 6 and 7, the lens 46 is secured to a lens base 50 mounted on a first lens bracket 49 which is supported for movement in a direction perpendicular to the optical axis of the lens 46 by a guide rod 52 secured to a second lens bracket 51. The second lens bracket 51 is guided by a guide 53 secured to a machine base for movement in the direction of the principal light ray which is inclined through an angle $\theta$ with respect to an optical axis 72 of the lens 46.

If the optical axis 72 of the lens 46 is fixed, it is necessary to align copy sheets at the center thereof when the rate of magnification is varied. However, in positioning the copy sheets, it is easier to make the end edge of each sheet match a mark. Therefore, a difficulty encountered in positioning the copy sheets when the rate of magnification is varied is eliminated if one end edge of each copy sheet is fixed in position. Also, when a side edge of each transfer printing sheet is utilized in separating the transfer printing sheet from the drum, it is advantageous that the optical image and a side edge of each transfer printing sheet are disposed in predetermined positions on the outer periphery of the photosensitive drum. In order to meet these requirements, the optical system moving device is constructed such that the lens 46 can be moved in the direction of the principal light ray and in a direction perpendicular to the optical axis of the lens 46. Thus the first lens bracket 49 supporting the lens 46 can move, together with the second lens bracket 51, in the direction of the principal light ray which is inclined through an angle $\theta$ with respect to the optical axis 72 of the lens 46, and at the same time can move independently in a direction perpendicular to the optical axis of the lens 46. The amount of movement of the lens 46 in the direction of the principal light ray and the amount of movement thereof in a direction perpendicular to its optical axis are determined beforehand in accordance with the rate of magnification of an original, and a cam 54 is provided so that the lens can automatically move predetermined distances. The cam 54 is formed with a cam groove 55 whose shape is determined by the amount of movement of the lens in a direction parallel to the principal light ray and the amount of movement of the lens in a direction perpendicular to the optical axis of the lens 46. A cam follower 56 attached to the first lens bracket 49 is received in the cam groove 55.

The second lens bracket 51 is threadably connected to a drive screw 58, guided for movement in parallel with the principal light ray by a guide rod 57 secured to the machine frame 1, and rotatably supported by the machine frame 1. Rotation of the drive screw 58 moves the second lens bracket 51 and hence the lens 46 in a direction parallel to the principal light ray. At this time, the first lens bracket 49 and hence the lens 46 move in a direction perpendicular to the optical axis 72 of the lens 46 by the action of the cam follower 56.

The drive screw 58 has mounted thereon a pulley 59 which is drivingly connected through a belt 62 to a pulley 61 mounted on a magnification varying motor 60. Thus the lens 46 can be moved by the magnification varying motor 60.

The third mirror 131 and fourth mirror 132 are secured to a mirror bracket 63 which is supported by the machine frame 1 for movement in the direction of an arrow R in FIG. 6 which is inclined to a certain degree with respect to the direction of movement of the lens 46. The direction of the arrow R is preferably a direction which is parallel to the bisector of the angle formed by the principal light ray A for the third mirror 131 and the principal light ray B for the fourth mirror 132. As shown in FIG. 7, the mirror bracket 63 is guided for sliding movement by a guide rod 64 secured to the machine frame 1 and urged to move leftwardly in the figure by the biasing force of a spring 65 mounted on the guide rod 64, so that a cam follower 66 mounted on the mirror bracket 63 is pressed by the biasing force of the spring 65 against a second cam surface 67b of a mirror cam 67. The mirror cam 67 is pivotally supported through a pin 68 by the machine frame 1 and has a first cam surface 67a which is urged by the biasing force of the spring 65 to press against a mirror driving member such as a roller 69 which is attached to the second lens bracket 51.

The first cam surface 67a of the mirror cam 67 is formed as a surface which is inclined with respect to the direction of movement of the mirror driving member 69, with the result that the mirror cam 67 pivots about the pin 68 as the lens 46 moves and hence the mirror driving member 69 moves. As the mirror cam 67 pivots about the pin 68, the cam follower 66 moves along the second cam surface 67b of the mirror cam 67, thereby moving the mirror bracket 63. Movement of the mirror bracket 63 moves the third and fourth mirrors 131 and 132. By selecting suitable contours for the first cam surface 67a and the second cam surface 67b of the mirror cam 67, it is possible to establish beforehand the relationship between the amount of movement of the lens 46 and the amount of movement of the third and fourth mirrors 131 and 132.

If several different rates of magnification of an original are selected beforehand and the magnification varying motor 60 is arranged to stop when the lens 46 has reached any of the positions of the selected magnifications, it will be possible to readily effect control electrically of the operation of positioning the lens and the mirrors in desired positions. In FIG. 6, two lens positioning switches 70 are shown. By adding a switch, not shown, for producing copies of the same size as an original, it is possible to selectively produce three different sizes of copies of an original.

If a switch actuator 71, mounted on the second mirror bracket 51 as shown in FIG. 7, actuates any one of the lens positioning switches 70 which has been selected through a control panel, the magnification varying motor 60 will stop and the third and fourth mirrors 131 and 132 are disposed in a predetermined position.

From the embodiment shown in FIG. 5, it will be appreciated that a copying apparatus in which two original placing stations can be selectively used and copies differing in size from the original can be produced can be operated by using a single slit illuminating device. In this case, if light rays incident on the photosensitive drum are in the direction of the normal to the drum, an arrangement has only to be made in a manner to make the angle formed by the surface of an original and the optical path a right angle and to bring the optical axis of the lens into alignment with the principal light ray of the optical path.

From the foregoing description, it will be appreciated that the copying apparatus according to the invention offers many advantages. It makes possible the selection of the position in which an original is placed, it makes it possible to produce copies on a reduced or enlarged scale as desired from an original, and the operation of the apparatus is simple because the end edge of each copy sheet can be positioned by using a single mark in spite of the fact that duplicates produced differ in size from the original. Since the sheet original can be fed by the original feed and delivery device, there is no danger of deviation of the original from a predetermined position when the original is kept down by means of the pressing plate and positioning of an original can be effected without any trouble. Moreover, the copying apparatus according to the invention has the advantage of producing a copy on a reduced scale from an original of a large size in a sheet copying mode.

What we claim is:

1. A copying apparatus, comprising, in combination, a first original placing station having a contact glass plate for placing a bulky original thereon; a second original placing station having a device for conveying an original in sheet form, and having an illuminating glass plate; at least one slit-illuminating device operatively associated with said original placing stations to illuminate an original thereon; at least one optical system operable to form an optical image of an original placed on an original placing station; a photosensitive member arranged to be exposed to the optical image of an original to form thereon an electrostatic latent image of the original; a developing device operable to develop the electrostatic latent image into a visible image; and means operable to switch the copying operation between said first and second original placing stations; including means operable to vary the degree of magnification of an original placed in said second original placing station by changing the speed of the original conveying device thereof and by moving at least one of an element of said optical system, a surface of the original, and the photosensitive member, whereby to vary the optical path length.

2. A copying apparatus, as claimed in claim 1, including plural slit illuminating devices, each operatively associated with a respective one of said placing stations; and plural optical systems each operable to form an optical image of an original placed on a respective original placing station; said means operable to switch the copying operation between said first and second original placing stations comprising means operable to selectively energize only one of said illuminating devices at a time.

3. A copying apparatus, as claimed in claim 1, including means operable to vary the degree of magnification of an original placed in said second original placing station by changing the speed of the original conveying device thereof and by moving at least one of an element of said optical system, a surface of the original, and the photosensitive member, whereby to vary the optical path length.

4. A copying apparatus, as claimed in claim 1, including a single slit illuminating device operatively associated with both said original placing stations to illuminate originals placed thereon.

5. A copying apparatus, as claimed in claim 4, including means mounting said common slit illuminating device for reciprocation in an illuminating zone of said first original placing station and providing for movement of said common slit illuminating device beyond such illuminating zone of said first original placing station into a stationary illuminating position for said second original placing station.

6. A copying apparatus, as claimed in claim 1, including respective slit illuminating devices operatively associated with each original placing station to illuminate an original placed thereon; respective optical systems each operable to form an optical image of an original on a respective one of said original placing stations; and means mounting the slit illuminating device operatively associated with said first original placing station to reciprocate in an illuminating zone for said first original placing station to illuminate an original placed thereon; means stationarily mounting the illuminating device operatively associated with said second original placing station for illuminating an original placed thereon; said means operable to switch the copying operation between said first and second original placing stations comprising a movable mirror operable to switch the optical path, to said photosensitive member, between said two respective optical systems.

7. A copying apparatus, comprising, in combination, a first original placing station having a contact glass plate for placing a bulky original thereon; a second original placing station having a device for conveying an original in sheet form, and having an illuminating glass plate; at least one slit-illuminating device operatively associated with said original placing stations to illuminate an original thereon; at least one optical system operable to form an optical image of an original placed on an original placing station; a photosensitive member arranged to be exposed to the optical image of an original to form thereon an electrostatic latent image of the original; a developing device operable to develop the electrostatic latent image into a visible image; and means operable to switch the copying operation between said first and second original placing stations; respective slit illuminating devices operatively associated with each original placing station to illuminate an original placed thereon; respective optical systems each operable to form an optical image of an original on a respective one of said original placing stations; and means mounting the slit illuminating device operatively associated with said first original placing station to reciprocate in an illuminating zone for said first original placing station to illuminate an original placed thereon; means stationarily mounting the illuminating device operatively associated with said second original placing station for illuminating an original placed thereon; said means operable to switch the copying operation between said first and second original placing stations comprising a movable mirror operable to switch the optical path, to said photosensitive member, between said two respective optical systems, an optical assembly common to both said optical systems and including at least one lens and at least one mirror which are movable to vary the length of the optical path between said original placing stations and said photosensitive member; said optical system operable to form an optical image of an original placed on said first original placing station including a further mirror reciprocable in synchronism with the slit illuminating device operatively associated with said first original placing station; and means operable to vary the degree of magnification of an original placed on an original placing station by changing the position of one of said lens and said at least one first-mentioned mirror, and by changing the speed of one of the then active slit illuminating device and the photosensitive member.

8. A copying apparatus, as claimed in claim 7, in which said means operable to vary the degree of magnification of an original changes the position of said lens.

9. A copying apparatus, as claimed in claim 7, in which said means operable to vary the degree of magnification of an original changes the position of said lens of said optical assembly.

10. A copying apparatus, as claimed in claim 7, in which said means varying the degree of magnification of an original changes the speed of the slit illuminating device operatively associated with said first original placing station.

11. A copying apparatus, as claimed in claim 7, in which said means for varying the degree of magnification of an original changes the speed of said photosensitive member.

* * * * *